US012581251B2

(12) United States Patent
Wilson

(10) Patent No.: US 12,581,251 B2
(45) Date of Patent: Mar. 17, 2026

(54) METHOD OF PROVIDING IMPROVED AUDIO PROCESSING MODEL

(71) Applicant: SKYWORKS SOLUTIONS, INC., Irvine, CA (US)

(72) Inventor: Michael Rand Wilson, Corbett, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 96 days.

(21) Appl. No.: 18/611,813

(22) Filed: Mar. 21, 2024

(65) Prior Publication Data

US 2024/0334138 A1 Oct. 3, 2024

Related U.S. Application Data

(60) Provisional application No. 63/454,985, filed on Mar. 28, 2023.

(51) Int. Cl.
H04R 25/00 (2006.01)
H04W 4/029 (2018.01)

(52) U.S. Cl.
CPC .......... H04R 25/507 (2013.01); H04W 4/029 (2018.02); *H04R 2225/55* (2013.01)

(58) Field of Classification Search
CPC .. H04R 25/507; H04R 2225/55; H04W 4/029
USPC ........................................ 381/314, 312, 315
See application file for complete search history.

(56) References Cited

U.S. PATENT DOCUMENTS

| | | | | |
|---|---|---|---|---|
| 12,451,122 | B1 * | 10/2025 | Werchniak | ............. G10L 15/063 |
| 2011/0295590 | A1 * | 12/2011 | Lloyd | ..................... G10L 15/22 |
| | | | | 704/8 |
| 2018/0041639 | A1 * | 2/2018 | Gunawan | ............. H04L 65/4038 |
| 2021/0368268 | A1 * | 11/2021 | Lee | ......................... G06F 3/1446 |
| 2023/0373654 | A1 * | 11/2023 | Goyal | ..................... H04S 3/008 |

FOREIGN PATENT DOCUMENTS

| | | | | |
|---|---|---|---|---|
| CN | 102089809 | * | 6/2013 | ........... G10L 19/265 |

* cited by examiner

*Primary Examiner* — William J Deane, Jr.
(74) *Attorney, Agent, or Firm* — Lando & Anastasi, LLP

(57) ABSTRACT

A method of providing an audio processing model is provided. The method comprises providing, over a network, an initial audio processing model to a first user device and a second user device; receiving first user data from the first user device and second user data from the second user device; updating the initial audio processing model to generate a first updated audio processing model based on the first user data; updating the initial audio processing model to generate a second updated audio processing model based on the second user data; and providing, over the network, the first updated audio processing model to the first user device and the second updated audio processing model to the second user device. Related methods and devices are also provided.

20 Claims, 6 Drawing Sheets

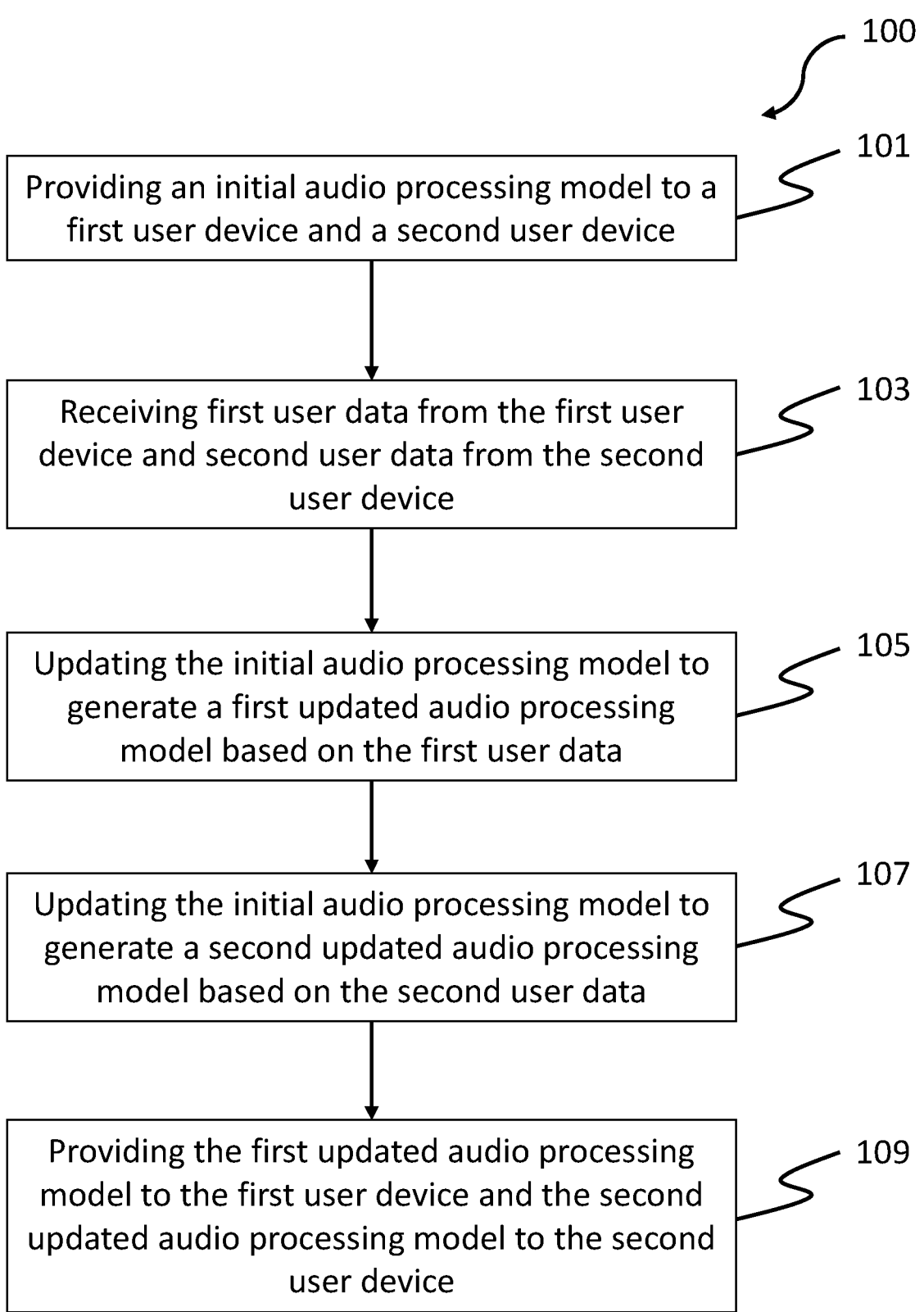

100

101

Providing an initial audio processing model to a first user device and a second user device

103

Receiving first user data from the first user device and second user data from the second user device

105

Updating the initial audio processing model to generate a first updated audio processing model based on the first user data

107

Updating the initial audio processing model to generate a second updated audio processing model based on the second user data

109

Providing the first updated audio processing model to the first user device and the second updated audio processing model to the second user device

FIG. 1

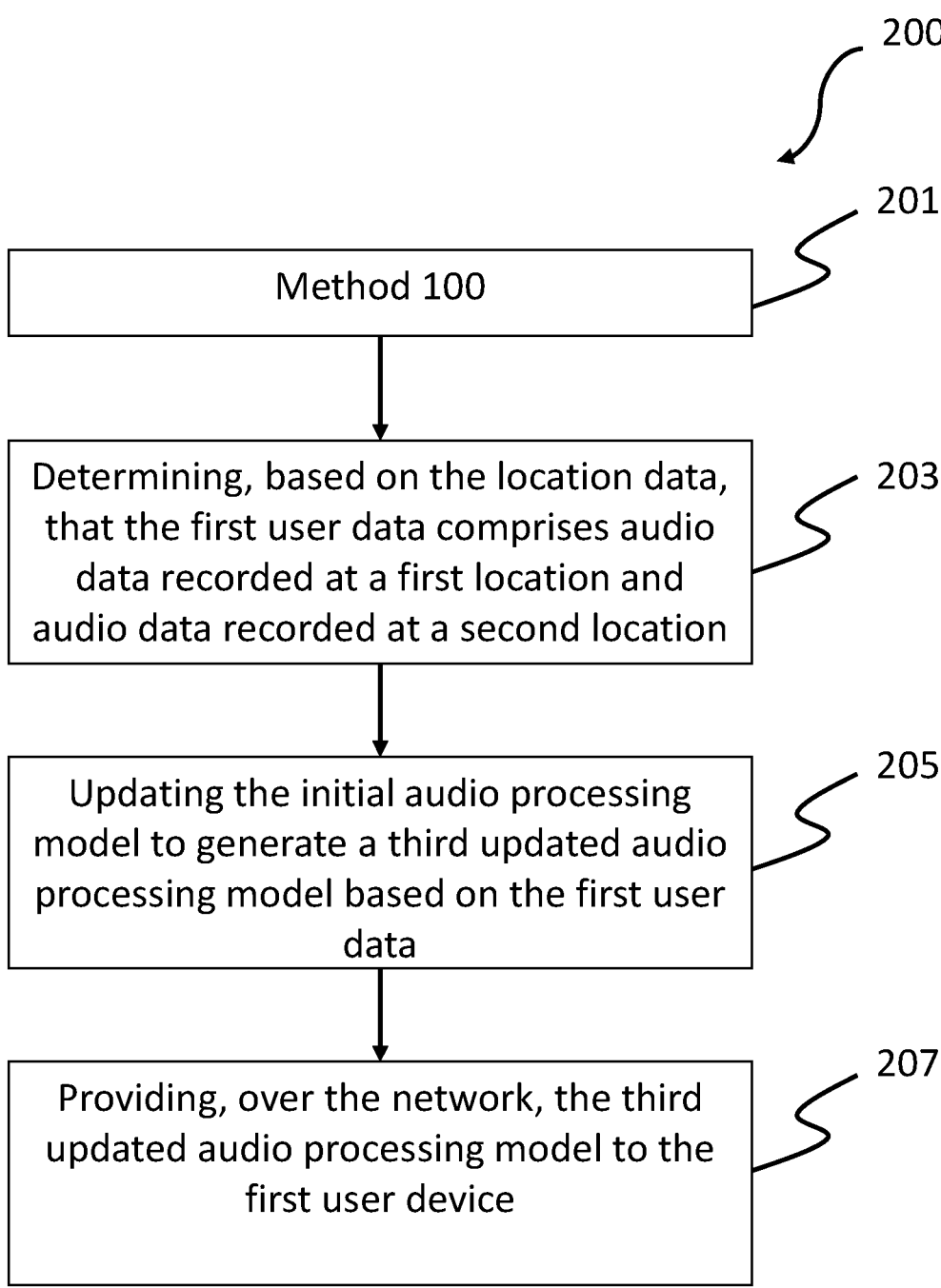

200

201

Method 100

Determining, based on the location data, that the first user data comprises audio data recorded at a first location and audio data recorded at a second location

203

Updating the initial audio processing model to generate a third updated audio processing model based on the first user data

205

Providing, over the network, the third updated audio processing model to the first user device

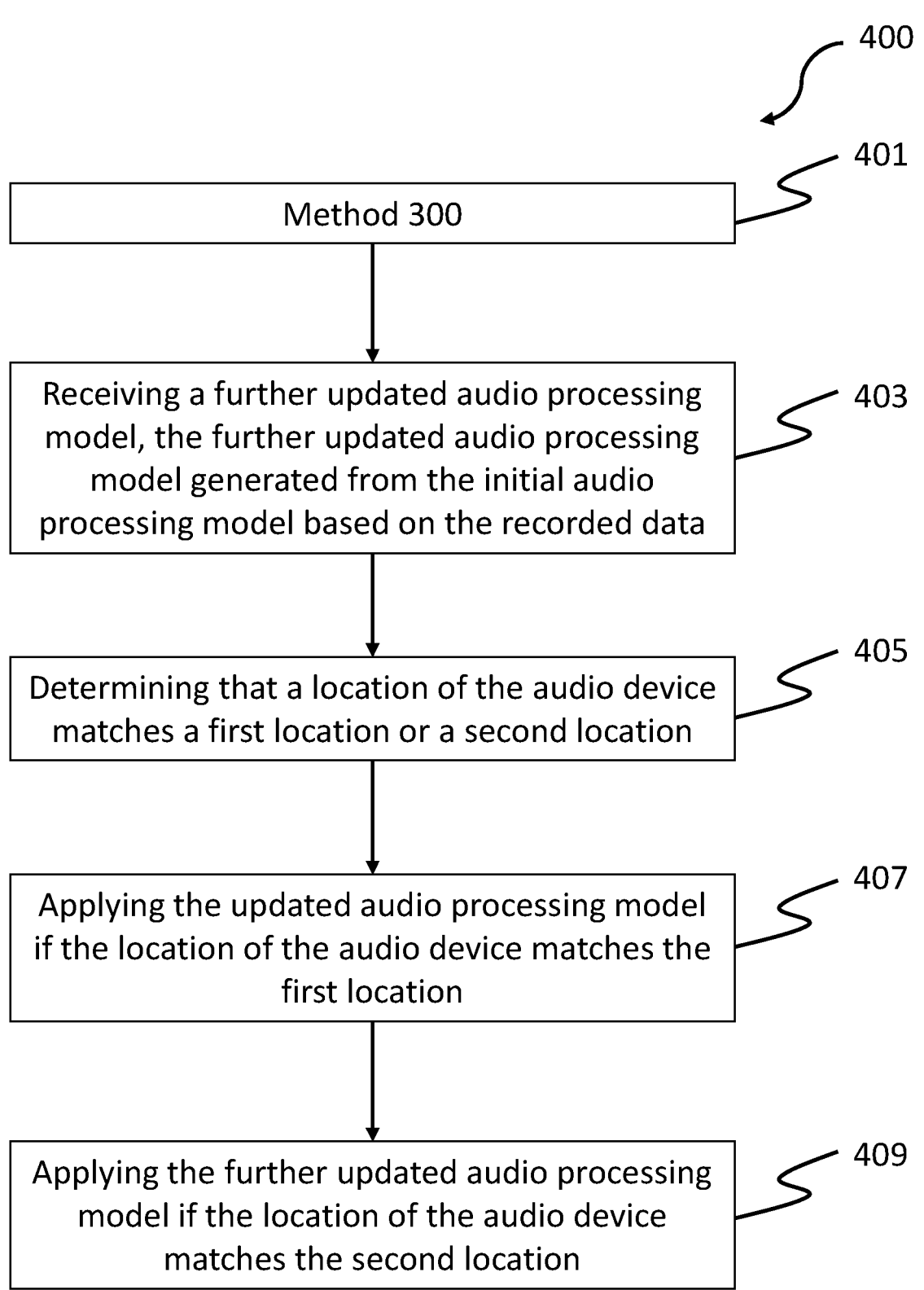

400

401

Method 300

Receiving a further updated audio processing model, the further updated audio processing model generated from the initial audio processing model based on the recorded data

403

Determining that a location of the audio device matches a first location or a second location

405

Applying the updated audio processing model if the location of the audio device matches the first location

407

Applying the further updated audio processing model if the location of the audio device matches the second location

METHOD OF PROVIDING IMPROVED AUDIO PROCESSING MODEL

CROSS-REFERENCE TO RELATED APPLICATIONS

This application claims priority under 35 U.S.C. § 119(e) to U.S. Provisional Patent Application Ser. No. 63/454,985, titled "METHOD OF PROVIDING IMPROVED AUDIO PROCESSING MODEL," filed Mar. 28, 2023, the entire contents of which is incorporated herein by reference for all purposes.

BACKGROUND

Field

Aspects and embodiments of the present disclosure relate to a method of providing an audio processing model. In particular, the audio processing model can be provided to a user device and updated based on user data collected by the user device, personalizing the audio processing model to that user and user device. In some instances, the audio processing model can be an AI model. Embodiments also relate to a corresponding non-transitory memory and an audio device.

Description of the Related Technology

Many audio devices perform some sort of processing on audio data received by the audio device. For example, hearing aids may amplify audio data received by microphones within the hearing aid. Preferably, only desired sounds are amplified, such as a person speaking, whilst background noise is not. In another example, noise cancelling headphones may detect environmental noise and eliminate or reduce it so that the user only hears the sound, such as music, output from the headphones.

Processing audio data in this manner can be done using artificial intelligence methods, such as machine learning and neural networks. AI models can be deployed to an audio device, and may make the audio device more effective at implementing the required audio processing. However, audio devices are typically small devices without much native computing power. Therefore, AI models deployed on such audio devices need to be trained in advance. This can be disadvantageous as the training data may not reflect how a particular user uses their audio device, reducing the effectiveness of the AI model in the audio device. Furthermore, the AI model is static and so cannot be improved. It is desirable to provide methods and devices that overcome these, and/or other, challenges.

SUMMARY

According to a first embodiment there is provided a method of providing an audio processing model. The method comprises providing an initial audio processing model to a first user device and a second user device; receiving first user data from the first user device and second user data from the second user device; updating the initial audio processing model to generate a first updated audio processing model based on the first user data; updating the initial audio processing model to generate a second updated audio processing model based on the second user data; and providing the first updated audio processing model to the first user device and the second updated audio processing model to the second user device.

In one example, the initial audio processing model is an AI audio processing model.

In one example, the initial audio processing model comprises training the AI audio processing model on the first and second user data to generate the first and second updated audio processing models respectively.

In one example, the audio processing model is a noise cancellation model or a hearing aid model.

In one example, the first and second user data comprise audio data recorded by the first and second user devices respectively.

In one example, the first and second user data further comprise location data, the location data providing a location at which some or all of the audio data was recorded.

In one example, the method further comprises determining, based on the location data, that the first user data comprises audio data recorded at a first location and audio data recorded at a second location; updating the initial audio processing model to generate a third updated audio processing model based on the first user data; and providing, over the network, the third updated audio processing model to the first user device. Furthermore, the initial audio processing model is updated to generate the first updated audio processing model based on the audio data recorded at the first location and wherein the initial audio processing model is updated to generate the third updated audio processing model based on the audio data recorded at the second location.

In one example, the location data of the first and second user data is, at least in part, derived from the audio data of the first and second user data respectively.

In one example, the location data defines a geographical location or an environmental location.

In one example, the location data comprises GPS data or location data derived from a Wi-Fi, Bluetooth, or cellular network.

In one example, the network is a Wi-Fi or a cellular network.

According to another embodiment there is provided a method of receiving an audio processing model at an audio device. The method comprises receiving an initial audio processing model; recording data at the audio device; sending the recorded data to a server; and receiving a first updated audio processing model, the first updated audio processing model generated from the initial audio processing model based on the recorded data.

In one example, the audio processing model is a noise cancellation model or a hearing aid model.

In one example, the recorded data comprises audio data.

In one example, the recorded data comprises location data, the location data providing a location at which some or all of the audio data was recorded.

In one example, the location data defines a geographical location or an environmental location.

In one example, the method further comprises receiving a third updated audio processing model, the third updated audio processing model generated from the initial audio processing model based on the recorded data. Furthermore, the initial audio processing model is updated to generate the first updated audio processing model based on audio data recorded at a first location and wherein the initial audio processing model is updated to generate a third updated audio processing model based on audio data recorded at a second location.

In one example, the method further comprises determining that a location of the audio device matches the first location or the second location; applying the first updated audio processing model if the location of the audio device matches the first location; and applying the third updated audio processing model if the location of the audio device matches the second location.

According to a third embodiment there is provided a non-transitory memory comprising instructions that, when executed on one or more processors, cause the one or more processors to perform the method of any of the first or second embodiment.

According to a fourth embodiment there is provided an audio device comprising one or more processors and the non-transitory memory of the third embodiment.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1 is a method according to aspects of the present disclosure;

FIG. 2 is another method according to aspects of the present disclosure;

FIG. 4 is another method according to aspects of the present disclosure;

DETAILED DESCRIPTION

Figure 3:
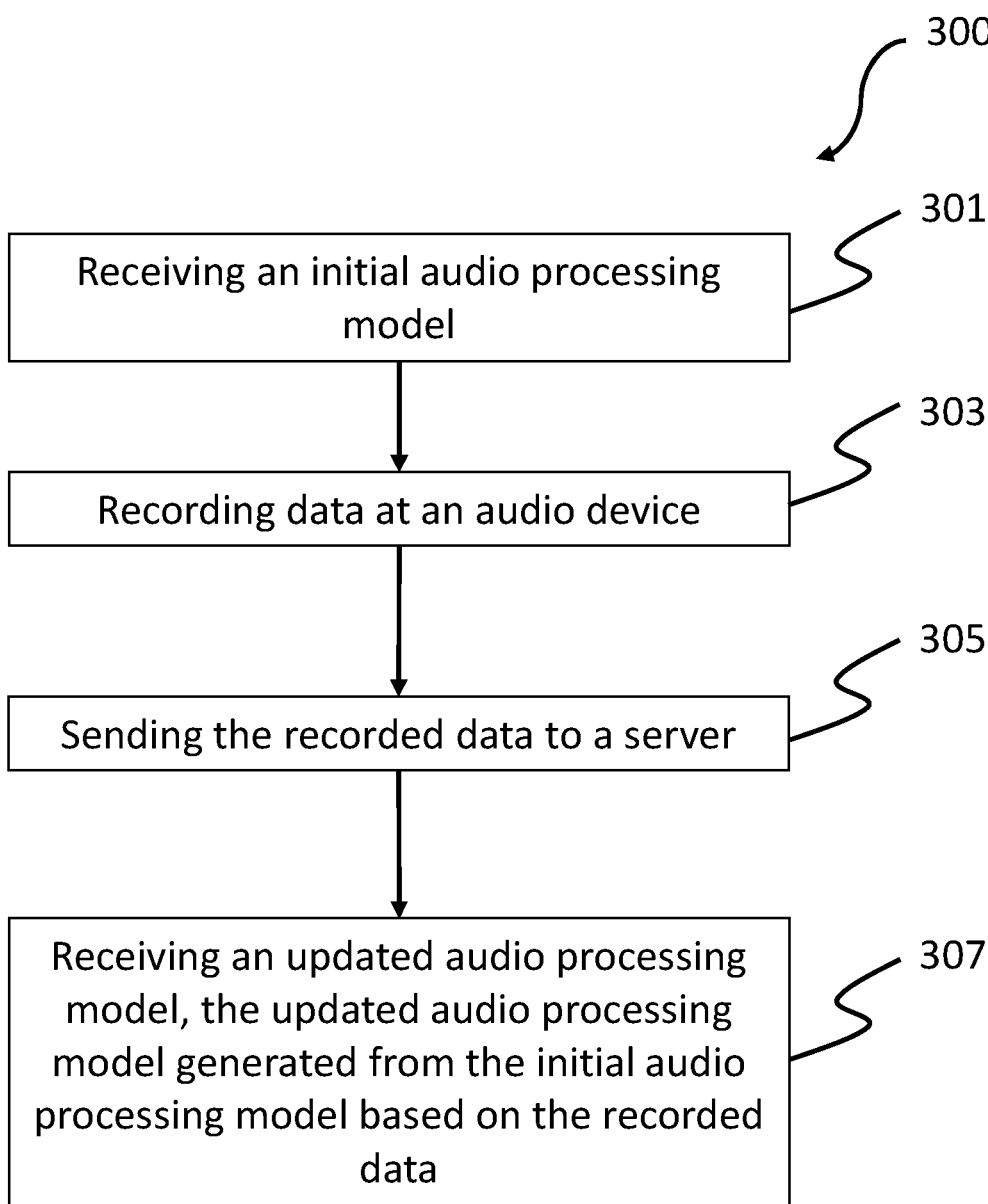
FIG. 3 is another method according to aspects of the present disclosure.

Aspects and embodiments described herein are directed to a method and devices for providing an audio processing model that can provide a personalized audio experience for a user in a convenient and efficient manner.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Labels such as "first," "second," and "third" are merely for identification purposes only, and do not imply any preference, order or priority, unless expressly indicated or otherwise implied by the context. Furthermore, the use of numerical labels such as "first" and "third," without the use of the label "second," does not imply that any further features are or need be present.

FIG. 1 illustrates a method 100 according to aspects of present disclosure. Method 100 is a method of providing an audio processing model. An audio processing model may be, in general, any model or algorithm that processes audio data. For example, audio processing models may include noise cancelling algorithms, hearing aid algorithms, models for classifying audio data, models for clarifying, cleaning or otherwise enhancing audio data, and the like. Method 100 provides an audio processing model that is personalized to different users in a convenient and efficient manner.

Method 100 begins at step 101, with providing an initial audio processing model to a first user device and a second user device. At this step 100, an initial audio model is not personalized to any users, and represents a default or starting audio model. For example, this initial audio model may be provided by uploading the initial audio model to a user device at a factory during manufacture of the user device. In other embodiments, the initial audio model may be provided to the first and second user devices over a network. The first and second user devices may be two versions of the same device (e.g., two devices of the same model), or two different devices that are capable of implementing the audio processing model. For example, the first and second user devices may be headphones of the same model or different models.

At the next step, step 103, method 100 comprises receiving first user data from the first user device and second user data from the second user device. The first and second user data is preferably received from the respective first and second user devices over a network, such as a cellular network (e.g., 3G, 4G, and 5G networks), a Wi-Fi network, Bluetooth, or some combination of these or other networks. In particular, the first and second user data may be received, at a server or other computer system implementing method 100, via one or more intermediary devices. For example, in the case that the user devices are wireless headphones, they may provide the user data to a connected mobile phone over a Bluetooth connection, and the mobile phone may then forward on the user data via a cellular or Wi-Fi connection. In some cases, certain types of network may be used, such as those that do not incur charges based on usage or those having certain bandwidth or speeds. For example, the mobile phone in the above example may store the user data when only connected to a cellular network and wait until it is connected to a Wi-Fi network before forwarding on the user data.

The first and second user data comprises information that can be used to update the audio processing model. This can include performance and computing data collected by the user device about its own performance, audio data recorded by the user device, or location data, for example. In particular, it can be advantageous for the user devices to provide a combination of audio and location data, with the location data indicating a location at which the user device recorded the audio. The location data may be information about a geographical or an environmental location. By geographical location, it is meant a particular physical location, such as may be provided via GPS information, derived from Wi-Fi or other network connections, etc. On the other hand, by environmental location, it is meant a type of location defined by the environment, such as "by a road", "in an office", "on a train" etc. An environmental location may be derived from a geographical location (e.g., GPS data indicating that the device is by a main road), from audio data recorded by the device (e.g., audio data of cars driving past), or a combination of the two and/or other inputs. A user of the user device may also manually input location and/or audio data. This may be done, for example, by selecting a mode or profile of the user device, such as "office", or "train commute", which may be used to derive, in particular, an environmental location of the user device.

When the first and second user data has been received from the respective first and second user devices, the method 100 proceeds to step 105. At step 105, the method 100 comprises updating the initial audio processing model to generate a first updated audio processing model based on the first user data. At step 107, the method 100 comprises updating the initial audio processing model to generate a second updated audio processing model based on the second user data.

At these steps 105, 107, the initial audio processing model, representing a default or un-customised audio processing model, is updated based on the first user data and the second user data to provide two updated versions of the audio processing model: a first updated audio processing model customised for a user of the first user device (the first user); and a second updated audio processing model customised for a user of the second user device (the second user).

In a preferred embodiment, the audio processing model is an AI audio processing model, such as a machine learning model or a neural network, trained on an initial training set to give rise to the initial audio processing model. In this case, updating the audio processing model can comprise further training the AI audio processing model on the first and second user data to generate the first updated audio processing model and the second updated processing model respectively. In this way, the first and second updated audio processing models diverge, because the training sets that are used to train the AI audio processing model to generate the first and second updated audio processing models are different. By training the AI audio processing model on data collected by the first user device, the resulting first updated audio processing model is tailored to the way in which the first user uses the first user device. For example, the AI audio processing model will adapt to the particular circumstances, environments, routines, etc. The AI audio processing model is similarly adapted to generate the second updated audio processing model for the second user.

After the initial audio processing model is updated, at steps 105 and 107, to generate the first and second updated audio processing models, method 100 comprises step 109 of providing the first updated audio processing model to the first user device and the second updated audio processing model to the second user device.

As with step 103 of receiving the first and second user data, providing the first updated audio processing model to the first user device and providing the second updating audio processing model to the second user device at step 109 also preferably occurs over a network, such as a cellular network (e.g., 3G, 4G, and 5G networks), a Wi-Fi network, Bluetooth, or some combination of these or other networks. Again, the first and second updated audio processing models may be provided to the respective first and second user devices via one or more intermediary devices. For example, in the case that the user devices are wireless headphones, the updated audio processing model may be sent to a connected mobile phone via a cellular or Wi-Fi connection, and the mobile phone may then forward the updated audio processing model to the connected wireless headphones over a Bluetooth connection. In some cases, certain types of network may be used, such as those that do not incur charges based on usage or those having certain bandwidth or speeds. For example, the mobile phone in the above example may only receive the updated audio processing model when it is connected to a Wi-Fi network, rather than when only connected to a cellular network. The user device, or any intermediary device, may provide an indication or notification that it is connected to a suitable network to receive the updated audio processing model.

Having received the relevant updated audio processing model, a user device can then implement the updated audio processing model in place of the initial audio processing model. In this way, the user's experience using their user device will improve over time and through use of the user device due to tailored improvements to the audio processing model used by the user device. In this way, a user device can be provided with a continually updated and improved audio processing model in a way that is not practical were all of the steps to be carried out locally. For example, many audio devices do not, and indeed cannot, comprise the local computing resources, both from a hardware and software perspective, to train AI models. In the manner of the present invention, however, the benefits of advances in AI technology to provide improved algorithms, including audio processing models, based on training data can be harnessed.

In some embodiments, the method can provide further customisation to the audio processing model of a device by providing more than one updated audio processing model to a given user device. That is, a user device may be provided with multiple updated audio processing models, with each of the updated audio processing models being customised for a different situation, circumstance, or environment.

FIG. 2 illustrates a method 200 for providing further, customised audio processing models, in particular in the case wherein the first and second user data comprise audio and location data, the location data providing a location at which some or all of the audio data was recorded.

As illustrated at step 201, method 200 follows on from method 100 illustrated in FIG. 1. Then, at step 203, method 200 comprises determining, based on the location data, that the first user data comprises audio data recorded at a first location and audio data recorded at a second location. The first and second locations may be geographical and/or environmental locations, in accordance with the previous discussion. Determining that the user data comprises audio data recorded at a particular location may be done based on location data included within the user data. For example, the user data may comprise GPS data and audio data, and these may be linked, for example, by a timestamp indicating that the location and audio data was collected at the same or similar times and hence the audio data can be linked with the location data. In particular, this may be applicable to geographical location data. Alternatively, particularly for environmental location data, this may be derived from the audio data within the user data. For example, it may be determined that audio data comprises audio of cars passing, and so it may be determined that the location at which the audio data was recorded is "by a road". Audio recognition techniques known in the art may be used for this purpose. A combination of these and/or other approaches may be used. It is also contemplated that location information may be provided by another device, such as a mobile phone, connected to the user device. Alternatively, it may, in part, be based on historical trends or routines of the user.

Subsequently, at step 205, method 200 comprises updating the initial audio processing model to generate a third updated audio processing model based on the first user data. In particular, the initial audio processing model is updated to generate the first updated audio processing model (at step 105 of method 100) based on the audio data recorded at the first location and wherein the initial audio processing model is updated to generate the third updated audio processing model, at step 205, based on the audio data recorded at the second location. In this way, much as method 100 generates customised audio processing models for two different users, method 200 generates customised audio processing models for the same user, but at two different locations.

For example, again taking the user device as a pair of headphones, the user of the headphones may frequently use them while commuting on a train and while at work. The headphones may record audio data during the commute and while at the user is at work, and this may be provided according to method 200. A first updated audio processing model may be generated based on audio data collected during the commute, which may be recognised as having an environmental location of "on a train" determined based on the audio data, and/or a geographical location along a railway line, for example. Another (the "third") audio processing model may be generated based on audio data collected while the user is at work, which may be recognised based on a geographical location determined through the connection of a mobile phone of the user, to which the headphones are connected, to a particular Wi-Fi network.

Once the third updated audio processing model is generated, at step 205, it may be provided to the user device at step 207. This may, in general, be performed in accordance with the discussion of step 109 of method 100 in which the first updated audio processing model is provided to the first user device.

In the case that a device may have multiple audio processing models that are all current (i.e., a new audio processing model is not to replace a previous version, but is for use in a different situation), such as described above whereby different audio processing models are provided for different environments, the user device may be provided with a plurality of audio processing models. Whilst the user device may be able to store a certain number of audio processing models on native memory, this memory may be limited. The available memory may be assigned based on a "last use" basis, or a "most frequently used" basis, to determine which of the audio processing models are stored locally on the user device. Alternatively, a schedule or routine of the user of the user device may be used to ensure that the correct audio processing models are available on the user device at the correct time.

Audio processing models not currently stored locally on the user device may be stored on a server or other computing system, and provided to the user device (e.g., as at steps 109 and 207 of methods 100 and 200 respectively, as discussed above) on an "as needed" basis. This may, for example, be in response to a request for a particular audio processing model from the user device. The user device might make such a request based upon it determining that it is in a particular location that has an audio processing model associated with it, but that that audio processing model is not stored locally. Alternatively, audio processing models that cannot be stored locally on the user device may be stored on another device associated with the user device and/or a user of the user device. In particular, they may be stored on a device to which the user device is connected, such as a mobile phone of the user of the user device. In this way, the audio processing models may remain readily accessible (without relying on the availability or quality of a cellular network, for example).

In some cases, multiple users may make use of the same user device. In this case, to enable audio processing models to be customised to each individual user, each user may have an associated profile that the log into or otherwise select when using the user device. In this case, the methods may associate audio processing models and user data not only with a particular user device, but with also with a particular user profile.

Conversely, it may be that a single user makes use of multiple user devices that each make use of audio processing models. Again, in this case, a user may be identified on the user device by an associated user profile. In this case, audio processing models and user device data may be associated not with a particular user device, but with a user profile, such that audio processing models corresponding to the same user are provided to each user device of that user. However, depending upon the types and functionalities of different user devices, a particular audio processing model may only be suitable to be used with a given subset of the user's user devices (e.g., only with user's headphones used for listening to music, and not with a headset comprising a microphone used for video conferencing). In this case, audio processing models may only be utilised across the relevant user devices.

Another aspect of the invention is illustrated in FIG. 3. Whereas FIGS. 1 and 2, showing methods 100 and 200, relate to methods performed at a server or other computing system, method 300 of FIG. 3 relates to a corresponding method performed at a user device.

Method 300, begins with receiving an initial audio processing model at step 301. As discussed in relation to step 101 of method 100, this may the initial audio processing model and may be provided during manufacture of the device and represent a default, un-customised audio processing model.

At step 303, method 300 comprises recording data at an audio device, which may be a user device. This may be recorded using microphones, for example, at the audio device. It is also contemplated, however, that data may be recorded by another device at the locale of the audio device. For example, a mobile phone connected to the audio device via Bluetooth may record the data. In particular, this data may be audio data and/or location data, as previously discussed above. Other data may include performance data of the audio device.

At step 305, the recorded data is then sent to a server, to update the audio processing model in accordance with the discussion of method 100 above. Then, at step 307, an updated audio processing model is received. The updated audio processing model is generated from the initial audio processing model based on the recorded data, again in accordance with the discussion of method 100 above.

FIG. 4 illustrates yet a further embodiment, following on from method 300. Method 400 begins, at step 401, with method 300. Then, at step 403, method 400 comprises receiving a further updated audio processing model, the further updated audio processing model generated from the initial audio processing model based on the recorded data. In particular, the initial audio processing model is updated to generate the updated audio processing model based on audio data recorded at a first location and the initial audio processing model is updated to generate the further updated audio processing model based on audio data recorded at a second location, in accordance with method 200 above.

The audio device then determines whether its location matches the first location or the second location. This may be done, for example, by determining its location or receiving location information regarding its location as discussed elsewhere herein. If the location of the audio device matches the first location, at step 407 the updated audio processing model is applied by the audio device. If the location of the audio device matches the second location, at step 409 the further updated audio processing model is applied by the audio device. As discussed above, the audio device may store multiple audio processing models, corresponding to different locations or situations, locally, or may obtain these as needed from a server, connected device (e.g., mobile phone), and the like.

Figure 5:
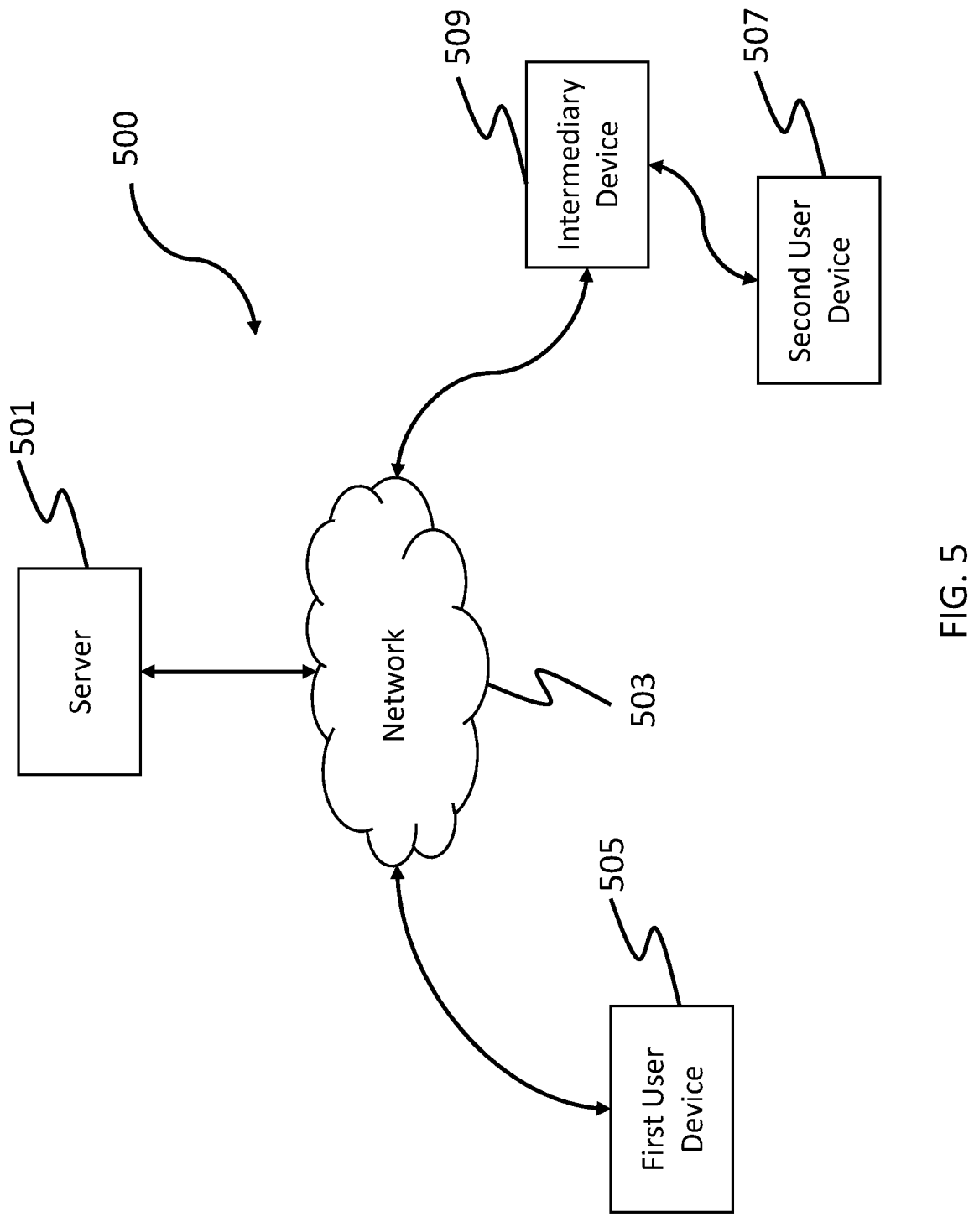
FIG. 5 is an exemplary system according to aspects of the present disclosure.

FIG. 5 illustrates an exemplary system 500 for implementing the methods disclosed herein. System 500 comprises a server 501, capable of implementing methods 100, 200, for example. Server 501 may be any suitable computing system or environment, such as a single server, server bank, computer network, cloud computing service, and the like, that is capable of communicating over network 503 and performing the required processing steps.

Server 501 is connected to network 503. This network may be any of a variety of networks, as discussed above, such as the internet, cellular networks (e.g., 3G, 4G, 5G networks), Wi-Fi networks, and the like. Network 503 merely needs to allow for the exchange of data between the user devices 505, 507 and server 501 (potentially via one or more intermediary devices 509). Network 503 may be wired or wireless, or some combination thereof. Network 503 may be a public network, particularly if server 501 is a server not owned by the owner of the user devices 505, 507; alternatively, network 503 may be a private network, particularly if server 501 is a server owned by the owner of the user devices 505, 507. For example, server 503 may be implemented via downloaded software on a personal computer of the owner of the user devices 505, 507, with said software being made available to the user upon purchase of a user device 505, 507.

The system may comprise a number of user devices 505, 507, and connected intermediary devices. These may be any suitable user device, in particular they may be audio devices. Such devices may be headphones, earphones, headsets, speakers, speakerphones, telephones, hearing aids, including any device incorporating such a device, such as cars or other vehicles, desktop or laptop computers, tablets, mobile phones or other mobile devices, and the like. Generally, user devices 505, 507 need to be capable of implementing the audio processing model provided by server 501 as well as communicating with server 501, via network 503 (and optionally one or more intermediary devices 509). User devices 505, 507 are also preferably capable of recording and/or determining audio data and/or location data, either natively or through one or more connected intermediary devices 509. Intermediary devices 509 may, for example, be a mobile phone or other mobile device.

Figure 6:
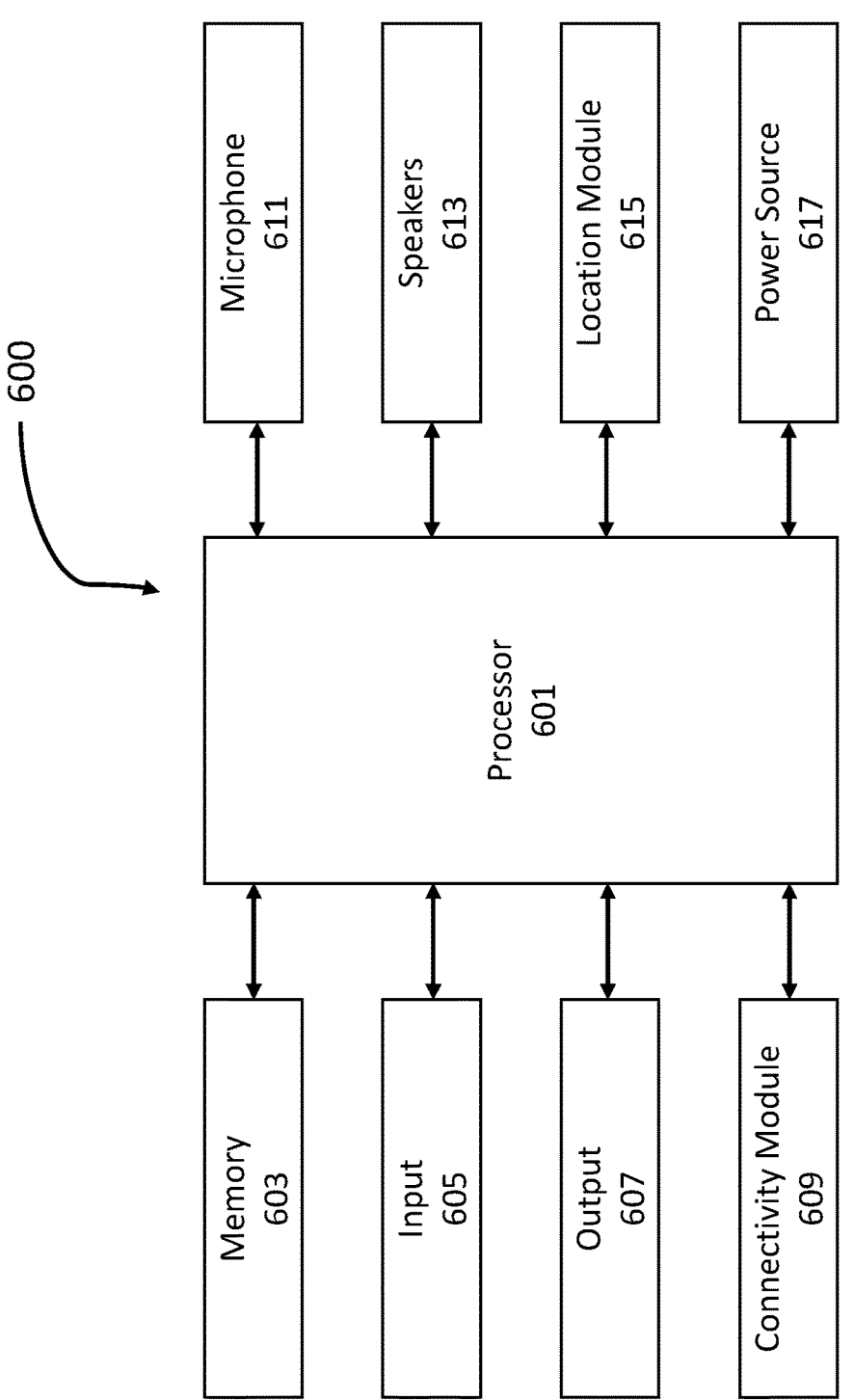
FIG. 6 is an exemplary user device according to aspects of the present disclosure.

FIG. 6 illustrates an exemplary user device or audio device 600. User device 600 comprises processor 601 configured to carry out computational tasks, such as those described herein. Processor 601 may comprise a single processor or computer chip, multiple linked processors, parallel processors, multiple integrated circuits and the like. Processor 601 is connected to memory 603, which may include volatile and non-volatile memory, such as RAM, EPROM, SSD, hard disk, and other forms of memory known in the art. Memory 603 may include a single memory block, or multiple memory blocks of the same or different types, and may store thereon operating instructions for device 600 (e.g., firmware, an operating system) and/or may store data or information received via a network or captured by the device 600.

Device 600 may comprise one or more inputs 605, in particular one or more microphones 611 (which in the case of headphones, hearing aids, etc., may be external (open to the environment) and/or internal (inside the car cup, car bud, or car canal space), and outputs 607, in particular speakers 613, as required for operation of the device 600. Inputs may include, but are not limited to, touchscreens, physical and touch buttons, mouse, keyboard, stylus, etc., and outputs may include, but are not limited to, one or more screens, haptic feedback systems, visual outputs such as lights, LEDs, etc.

In order for device 600 to communicate with other devices, a connectivity module 609 is provided. Connectivity module 609 is configured to facilitate connection and communication with other devices, and may be configured to provide wired and/or wireless connections. Connectivity module 609 may comprise the required hardware for a number of different types of connectivity, such as Wi-Fi, Bluetooth, cellular, and the like. In particular, connectivity module 609 may comprise one or more antennas and relevant front-end modules for wireless communication with other electronic devices.

Device 600 may also comprise a location module 615 which may be configured to collect location data and/or determine location data, in accordance with the various modes described herein.

Device 600 is powered by power source 617. This may comprise a wired power source, but preferably comprises a local power source such as a battery.

Servers discussed herein, such as server 501 of FIG. 5, may be substantially similar to user device 600, in particular comprising processor components, one or more connectivity modules, memories, power sources, and optionally one or more inputs and outputs.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:
1. A method of providing an audio processing model comprising:
provide an initial audio processing model to a first user device and a second user device;

receiving first user data from the first user device and second user data from the second user device;

updating the initial audio processing model to generate a first updated audio processing model based on the first user data;

updating the initial audio processing model to generate a second updated audio processing model based on the second user data; and providing the first updated audio processing model to the first user device and the second updated audio processing model to the second user device.

2. The method of claim 1 wherein the initial audio processing model is an AI audio processing model.

3. The method of claim 2 wherein updating the initial audio processing model includes training the AI audio processing model on the first and second user data to generate the first and second updated audio processing models respectively.

4. The method of claim 3 wherein the audio processing model is a noise cancellation model or a hearing aid model.

5. The method of claim 4 wherein the first and second user data includes audio data recorded by the first and second user devices respectively.

6. The method of claim 5 wherein the first and second user data further includes location data, the location data providing a location at which some or all of the audio data was recorded.

7. The method of claim 6 further comprising:

determining, based on the location data, that the first user data includes audio data recorded at a first location and audio data recorded at a second location;

updating the initial audio processing model to generate a third updated audio processing model based on the first user data; and providing, over a network, the third updated audio processing model to the first user device;

wherein the initial audio processing model is updated to generate the first updated audio processing model based on the audio data recorded at the first location and wherein the initial audio processing model is updated to generate the third updated audio processing model based on the audio data recorded at the second location.

8. The method of claim 6 wherein the location data of the first and second user data is, at least in part, derived from the audio data of the first and second user data respectively.

9. The method of claim 6 wherein the location data defines a geographical location or an environmental location.

10. The method of claim 6 wherein the location data includes GPS data or location data derived from a Wi-Fi, Bluetooth, or cellular network.

11. The method of claim 7 wherein the network is a Wi-Fi or a cellular network.

12. A method of receiving an audio processing model at an audio device comprising:

receiving an initial audio processing model;

recording data at the audio device;

sending the recorded data to a server; and receiving a first updated audio processing model, the first updated audio processing model generated from the initial audio processing model based on the recorded data.

13. The method of claim 12 wherein the audio processing model is a noise cancellation model or a hearing aid model.

14. The method of claim 12 wherein the recorded data includes audio data.

15. The method of claim 14 wherein the recorded data includes location data, the location data providing a location at which some or all of the audio data was recorded.

16. The method of claim 15 wherein the location data defines a geographical location or an environmental location.

17. The method of claim 15 further comprising:

receiving a third updated audio processing model, the third updated audio processing model generated from the initial audio processing model based on the recorded data;

wherein the initial audio processing model is updated to generate the first updated audio processing model based on audio data recorded at a first location and wherein the initial audio processing model is updated to generate the third updated audio processing model based on audio data recorded at a second location.

18. The method of claim 17 further comprising:

determining that a location of the audio device matches the first location or the second location;

applying the first updated audio processing model if the location of the audio device matches the first location; and applying the third updated audio processing model if the location of the audio device matches the second location.

19. A non-transitory memory comprising instructions that, when executed on one or more processors, cause the one or more processors to perform the method of claim 12.

20. An audio device comprising one or more processors and the non-transitory memory of claim 19.

* * * * *